ically, the preferred film to be used in the process of the invention is film made by the so-called bubble process wherein a tube is extruded and cooled before being inflated, reheated and stretched by a further bubble. The advantage of this process is that very thin films can be produced with controllable shrinkage characteristics.

United States Patent [19]
Gash

[11] 4,243,463
[45] Jan. 6, 1981

[54] METHOD OF PRODUCING CROSS LAMINATES

[75] Inventor: Duggan J. Gash, Lower Froyle, near Bentley, England

[73] Assignee: Koninklijke Emballage Industrie Van Leer B.V., Amstelveen, Netherlands

[21] Appl. No.: 844,864

[22] Filed: Oct. 25, 1977

[30] Foreign Application Priority Data

Oct. 27, 1976 [GB] United Kingdom ............... 44725/76

[51] Int. Cl.³ .................. B29D 7/24; B32B 31/02
[52] U.S. Cl. .................... 156/324; 264/346; 428/910
[58] Field of Search .............. 156/306, 322, 324; 428/409, 410, 910, 911; 264/342 RE, 346

[56] References Cited

U.S. PATENT DOCUMENTS

| | | | |
|---|---|---|---|
| 2,943,356 | 7/1960 | Rasmussen | 264/290 |
| 3,409,495 | 11/1968 | Rasmussen | 428/910 |
| 3,471,353 | 10/1969 | Rasmussen | 428/910 |
| 3,496,059 | 2/1970 | Rasmussen | 428/910 |
| 3,632,726 | 1/1972 | Knox et al. | 264/342 RE |
| 3,679,791 | 7/1972 | Reade | 264/342 RE |

FOREIGN PATENT DOCUMENTS

1414785 11/1975 United Kingdom .

*Primary Examiner*—John E. Kittle
*Attorney, Agent, or Firm*—Lawrence Rosen

[57] ABSTRACT

A method for improving the impact strength and other properties of monaxially oriented, thermoplastic polymeric film cross-laminates which comprises first forming the cross-laminate and then annealing it at an elevated temperature. The annealing may be carried out by passing the cross-laminate through an annealing oven or over a heated cylinder. Annealing temperatures can vary from 35° C. to a temperature below the melting temperature of the lowest melting thermoplastic film, excluding any adhesive or extruded bonding layer. A particularly useful annealing temperature is within the range of 60° to 180° C.

5 Claims, No Drawings

METHOD OF PRODUCING CROSS LAMINATES

This invention is concerned with a method of producing cross laminates from a set of substantially monaxially oriented thermoplastic polymeric films by bonding together said set of films in a properly crossed position.

Thermoplastic polymeric film laminates are known, or have been described, which comprise two or more substantially monaxially oriented layers, the directions of orientation of each layer being at an angle, preferably 45°, to the longitudinal dimension of the laminate and being at an angle, preferably 90°, to the direction of orientation of the adjacent layer(s). Such laminates are referred to herein, for convenience, as "cross-laminates". The layers of such cross-laminates may be bonded together in any suitable way, for example, by adhesive, spot-welding, or by extrusion lamination (that is the extrusion of a thin film of molten polymer between converging pre-formed films in the nip of a pair of nip rolls in which the laminate is formed). The production of cross-laminates is described, for example, in British Pat. Specification No. 1,414,785.

Cross-laminates have a number of advantageous properties, in particular they have much better tear resistance than a single-ply film of the same overall thickness and of the same polymer which has been biaxially oriented. It was found now, that their impact strength and other properties can be improved by annealing said cross laminates by subjecting them to an elevated temperature from 35° C. but below, the melting temperature of the lowest melting of the thermoplastic materials present therein, excluding any adhesive or extruded bonding layer.

For best impact strength, the temperature should be as high as possible subject to this limitation e.g. 1° C. below the melting temperature of the lowest melting of the thermoplastic materials present therein. There may be some loss of strength as measured by standard puncture and propagation of tear tests as the annealing temperature approaches the upper limit specified.

The annealing step is carried out, for example, by passing the cross-laminate through an annealing oven or over a heated cylinder while substantially free of tension and pressure.

The temperature used is preferably from 60° to 180° C., depending on the materials present in the laminate.

The plies of the laminate may be formed of the same or different polymers. Suitable thermoplastic polymers for the layers of the laminate are, for example, homo- and co-polymers of ethylene, polypropylene, polystyrene, polyvinyl chloride, polyvinylidene chloride, polyvinyl alcohol, and ethylene/vinyl acetate copolymers. The most preferred layer materials are polypropylene and high density polyethylene.

In order that the invention may be more fully understood, the following examples and comparative experiments are given by way of illustration.

EXAMPLE 1

High density polyethylene film (Unifos 2900 having a melting point of 131° C.) having a thickness of 50 μm and 37.5 μm respectively and monaxially oriented at 45° to the longitudinal dimension of the film, was formed into two-ply laminates using a two-component polyurethane adhesive (PU 12 of Bayer) that is two plies of the 50 μm material were used to form a first laminate having a nominal thickness of 100 μm, and two plies of the 37.5 μm material to form a second laminate having a nominal thickness of 75 μm. Application of the adhesive and the bonding conditions used were conventional and in accordance with the recommendations of the adhesive manufacturer.

Samples of each laminate were annealed by passing them over a hot roll maintained at a temperature of 120°–130° C., the time of contact with the roll being 15 seconds.

The unannealed and annealed samples were then subjected to the following tests for packaging materials:

(1) PPT—a puncture and propagation of tear test, measured in Newtons, which is a modified version of ASTM D2582-67.

(2) Toyo—a test for impact strength, measured in joules, carried out essentially as described in ASTM D781 but with the pyramidal head replaced by a hemispherical head.

The results obtained were as follows:

| Sample | Thickness (μm) | PPT (N) | Toyo (J) |
|---|---|---|---|
| unannealed | 100 | 50.02 | 4.2 |
| annealed | 100 | 50.02 | 7.7 |
| unannealed | 75 | 36.7 | 7.1 |
| annealed | 75 | 38.97 | 9.8 |

EXAMPLE 2

High density polyethylene tubular film of Unifos 2900 having a thickness of 45 μm was cold stretched length-wise and cut open along a helical line according to U.S. Pat. No. 2,943,356. The resulting film strip was oriented in a direction at 45° to the length direction of the strip. Two of said strips were extrusion laminated with low density polyethylene, such that the orientation of one layer of high density polyethylene was perpendicular to the orientation of the other layer. The cross laminate had a final thickness of about 100 μm.

Samples of this laminate were annealed using the same technique as described in example 1, but at different annealing temperatures.

The following test results were obtained:

| Sample | Temp. in °C. | PPT (N) | Toyo (J) |
|---|---|---|---|
| unannealed | — | 50.0 | 10.6 |
| annealed | 110 | 60.3 | 12.1 |
| annealed | 124 | 71.3 | 13.6 |
| annealed | 130 | 22.7 | 17.2 |

The improving test results of the PPT test at higher temperatures is remarkable. The sharp drop at 130° C. is probably due to the disappearing orientation near this temperature.

EXAMPLE 3

Example 1 was repeated except that now a polypropylene film of 50 μm thickness was used (GPE 102 of ici, melting point 154° C.). The annealing temperature was 141° C.

| | Test results | |
|---|---|---|
| Sample | PPT (N) | Toyo (J) |
| unannealed | 30.4 | 4.7 |

-continued

| Sample | Test results PPT (N) | Toyo (J) |
|---|---|---|
| annealed | 40.5 | 8.1 |

It is shown that laminates subjected to a treatment according to the invention show better test results than untreated laminates.

From laminates subjected to a treatment according to the invention e.g. sacks and tarpaulins of an improved strength can be made.

Thus, it is possible to use a thinner film and nevertheless to obtain the strength of a much thicker film.

I claim:

1. A method of producing cross laminates from a set of substantially monaxially oriented, solid polyolefin film which comprises bonding together said set of films in a properly crossed position, annealing said cross laminate by subjecting it to a temperature within the range of from 60° to 180° C., but below the melting temperature of the lowest melting of the thermoplastic materials present therein, excluding any adhesive or extruded bonding layer, and then recovering a polyolefin film cross laminate having improved impact strength.

2. A method according to claim 1, wherein said annealing is carried out by heating said cross-laminate at a temperature of 1° C. below the melting temperature of the lowest melting of the thermoplastic materials present therein, excluding the adhesive.

3. A method according to claim 1, wherein annealing is carried out by passing said cross-laminate through an annealing oven or over a heated cylinder, while substantially free of tension and pressure.

4. A method according to claim 1, wherein a cross laminate from 2 monaxially oriented high density polyethylene films is annealed by passing it for 15 to 20 seconds over a hot roll having a temperature of 120° to 130° C.

5. Laminates which have been annealed according to claim 1.

* * * * *